United States Patent [19]

Sakai

[11] 4,303,332
[45] Dec. 1, 1981

[54] ELECTROSTATIC RECORDING APPARATUS

[75] Inventor: Yuki Sakai, Hachioji, Japan

[73] Assignee: Konishiroku Photo Industry Co., Ltd., Tokyo, Japan

[21] Appl. No.: 101,190

[22] Filed: Dec. 7, 1979

[30] Foreign Application Priority Data

Dec. 13, 1978 [JP] Japan ............................ 53-153170

[51] Int. Cl.³ ...................... G03G 15/09; G03G 15/30
[52] U.S. Cl. .................................. 355/14 R; 355/7; 355/8
[58] Field of Search ............................ 355/8, 14 R, 7

[56] References Cited

U.S. PATENT DOCUMENTS

| | | | |
|---|---|---|---|
| 3,576,367 | 4/1971 | Sable | 355/7 X |
| 3,642,370 | 2/1972 | Meredith et al. | 355/8 X |
| 3,681,527 | 8/1972 | Nishiyama et al. | 355/8 X |
| 3,744,899 | 7/1973 | Sable | 355/14 R |
| 3,768,806 | 10/1973 | Reehil | 355/14 R X |
| 4,005,933 | 2/1977 | de Loye et al. | 355/8 X |
| 4,012,138 | 3/1977 | Washio et al. | 355/14 R X |
| 4,124,286 | 11/1978 | Barasch | 355/14 R X |
| 4,175,851 | 11/1979 | Kitamura et al. | 355/14 R |
| 4,188,113 | 2/1980 | Hiraga | 355/8 X |
| 4,268,164 | 5/1981 | Yajima et al. | 355/7 X |

Primary Examiner—S. J. Witkowski
Assistant Examiner—Richard M. Moose
Attorney, Agent, or Firm—James E. Nilles

[57] ABSTRACT

An electrostatic recording apparatus which is capable of composite reproduction, having an original projecting device for forming an electrostatic latent image of an original picture on the surface of a photosensitive member by scanning and projecting an original on a copy board, and a picture-forming device for causing a memory to read electric signals of characters fed from an external source and then forming an electrostatic latent image of characters on the surface of the photosensitive member based upon the thus read signals. The apparatus further comprising a position signal generator for producing position signals which give positions of the original picture on the copy board in relation to the scanning for projection, and a control signal generator for producing control signals responsive to the position signals and printing section signals which give sections in which the picture-forming device is allowed to effect the printing. A main control unit of the picture-forming device feeds the printing section signals to the control signal generator and controls the input and output of the memory as well as printing of characters upon receipt of control signals from the control signal generator, such that an original picture can be inserted between lines that are specified by the position signals of pictures in the form of electric signals.

3 Claims, 10 Drawing Figures

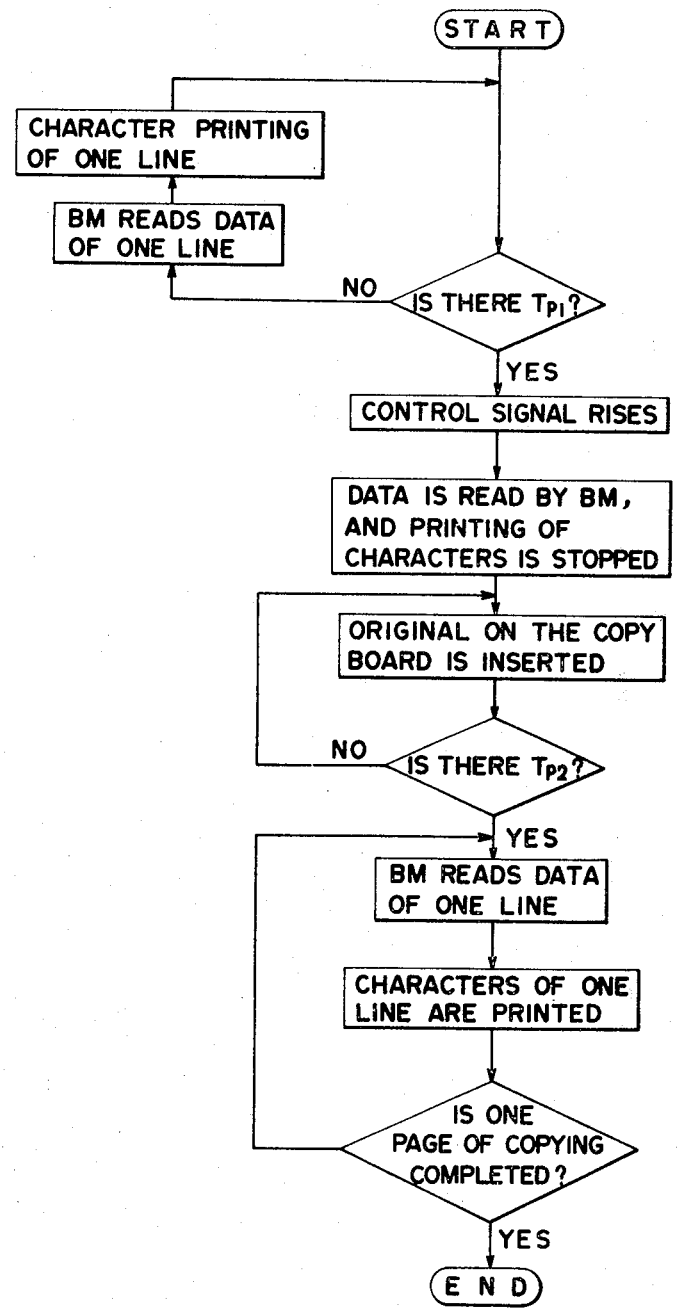

ELECTROSTATIC RECORDING APPARATUS

FIELD OF THE INVENTION

The present invention relates to an electrostatic recording apparatus such as an electrophotographic copying machine, which makes it possible to obtain composite reproduction by forming electrostatic latent images by means of an original projector and by forming characters (or patterns) relying upon electric signals on the surface of a photosensitive member which is electrically uniformly charged by an electric charge imparting device. More specifically, the invention relates to an electrostatic recording apparatus which is capable of inserting pictures projected from the original between any lines of characters, responsive to the electric signals.

BRIEF DESCRIPTION OF THE DRAWINGS

FIG. 5 depicts a flow chart for illustrating the operation of the electrostatic recording apparatus according to the present invention;

DESCRIPTION OF THE PREFERRED EMBODIMENT

Figure 1:
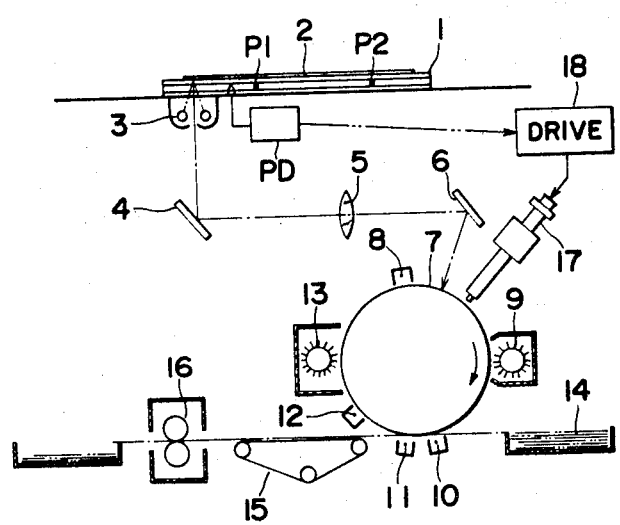
FIG. 1 is a side view schematically illustrating an electrostatic recording apparatus according to the present invention.
Figure 2:
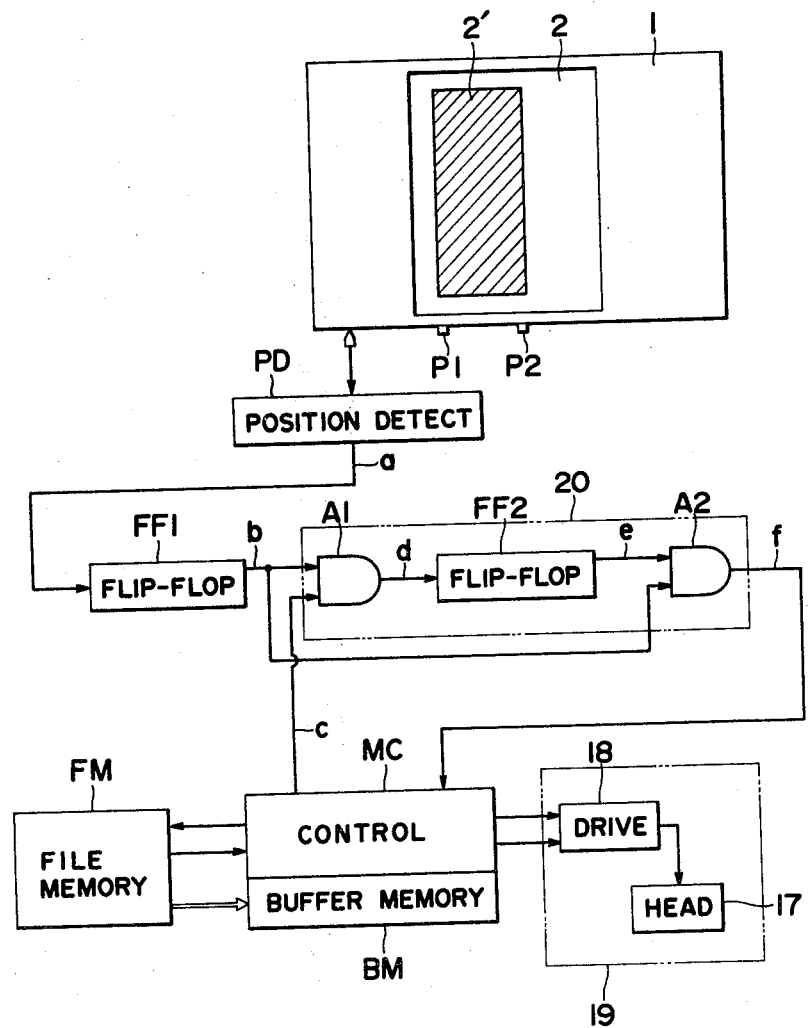
FIG. 2 is a block diagram showing the circuit of the apparatus which synthesizes pictures of an original and images created by electric signals.
Figure 3:
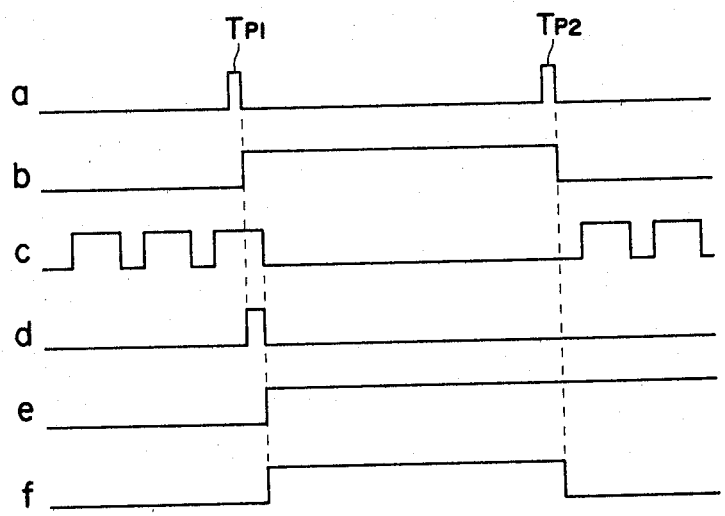
FIG. 3 and FIGS. 4-a, 4-b depict time charts of signals generated by the apparatus illustrated in FIG. 2.
Figure 4A:
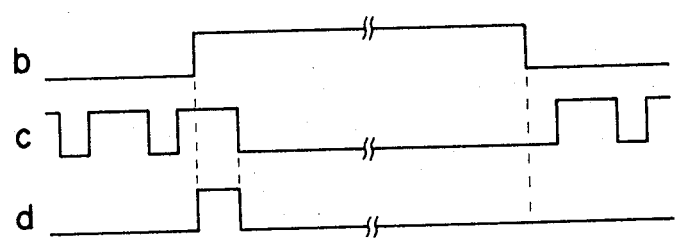
Figure 4B:
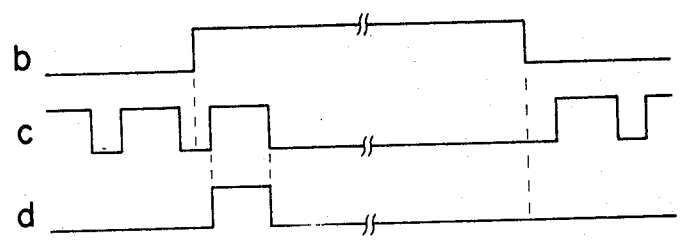

In FIGS. 1 and 2, reference numeral 1 denotes a moving copy board, 2 denotes an original that is to be projected, 2' denotes a picture consisting of characters or pictures described on the original that is to be projected, 3 a light source of an original projecting device, 4 a first reflector mirror, 5 a lens, 6 a second reflector mirror, 7 a drum-shaped photosensitive member, 8 an electric charge imparting device for uniformly charging the surface of the photosensitive member 7, 9 a developing device for visualizing an electrostatic latent image by toner in accordance with the copying or recording operation. Reference numerals 10 and 11 represent a transfer electrode for transferring the toner image and a separating electrode, 12 a device for removing electric charge remaining on the photosensitive member 7 after the separating process has been done, 13 a cleaning device consisting of a brush, 14 a paper onto which the picture will be transferred, 15 a conveyer device, and 16 denotes a fixing means. The above-mentioned members are constructed and arranged in the same manner as those of the conventional electrophotographic copying machines. Reference numeral 17 represents a printing head such as a cathode-ray tube, a needle electrode and so like for printing characters on the surface of the photosensitive member 7 in the form of an electrostatic latent image responsive to electric signals, and 18 denotes a printing head driving device. These two members constitute a device 19 for forming pictures responsive to the signals. Symbols P1 and P2 denote position-specifying members or setting members which are movably installed on the copy board 1 so as to indicate the front edge and rear edge of the range of the picture or image of the original 2 that is to be projected, PD denotes a position detector which detects positions of the position-specifying members P1, P2 and which produces a detection signal a, and FF1 represents a flip-flop circuit which produces a position signal b that electrically indicates a section in which is present the picture 2' upon receipt of detection signal a from the position detector PD. A position signal generator device is constituted by the abovementioned position-specifying members P1, P2, position detector PD, flip-flop circuit FF1 and means for moving the copy board 1 (or when the copy board is of the fixed type, means for scanning by moving the light source 3 or reflector mirror 4 of the original projecting device). When the original is to be scanned and projected by moving the copy board 1, the position detector PD remains stationary. However, when the original is to be scanned and projected by moving the original projecting device, the position detector PD is of course moved together with the original projecting device. Symbol FM denotes an external or a built-in file memory which stores the data of the original bearing characters which are sent from an external unit in the form of electric signals, BM denotes a buffer memory which reads electric signals of characters of one line from the file memory FM and which delivers the thus read signals to the printing head driving device 18, and MC denotes a main control unit which feeds a printing section signal c which indicates whether the picture-forming device 19 is printing characters of one line responsive to signals, to a control signal generator 20 consisting of AND circuits A1, A2 and a flip-flop circuit FF2, and which controls the input and output of the buffer memory BM as well as the operation of the printing head 17 actuated by the printing head driving device 18 upon receipt of control signals from the control signal generator 20. Namely, the main control unit MC produces a printing section signal c of a low level in a section where the buffer memory BM reads the electric signals, and produces a printing section signal c of a high level in a section where the printing head driving device 18 actuates the printing head 17 to print characters of line. The printing section signal c is fed to the AND circuit A1 of the control signal generator 20 together with a position signal b produced by the flip-flop circuit FF1 of the position signal generator. Therefore, when the position signal b rises in the printing section, and AND circuit A1 produces an AND signal d which rises together with the rise of the position signal b and which decays together with the decay of the printing section signal c at the end of the printing section, as shown in FIG. 3 or FIG. 4-a. When the position signal b rises in the section where the electric signals are read by the buffer memory BM, on the other hand, the AND circuit A1 produces an AND signal d which rises together with the rise of the printing section signal c at the entrance of the next printing section and which decays together with the break of the printing section signal c as shown in FIG. 4-b. The AND signal d produced by the AND circuit A1 is fed to the flip-flop circuit FF2. The flip-flop circuit FF2 is triggered by the decay of the AND signal d and produces a projection commencing position signal e of a high level. The projection commencing position signal e and position signal b produced by the flip-flop circuit FF1 of the position signal generator are fed to the AND circuit A2. Therefore, the AND circuit A2 produces a control signal f which rises with the rise of the projection commencing position signal e and which decays with the decay of the position signal b; the control signal f is fed to the main control unit MC. As the control signal f rises, the main control unit MC causes the buffer memory BM to discontinue the reading of electric signals and stops the subsequent printing operation, and further permits the light source 3 of the original projecting device to be turned on. Then, the light source 3 of the original projecting device is turned off by the decay of the control signal f, the buffer memory BM assumes the operation to read electric signals, and the subsequent printing operation is resumed.

Below is described the operation for forming composite reproduction by the electrostatic recording apparatus of the present invention equipped with the above-mentioned devices. The original 2 to be projected is placed on the copy board 1, whereby the front edge and rear edge of the picture 2' is indicated by the position-specifying members P1 and P2.

The copying sequence of the recording apparatus is then started. In a stage where the position detector PD is not yet detecting the position-specifying members P1, P2, the main control unit MC causes the buffer memory BM to read electric signals of characters of one line from the file memory FM, and then the data read by the buffer memory BM are imparted to the printing head 17 via printing head driving device 18, so that electrostatic latent image corresponding to the signals of the file memory FM is formed on the photosensitive member 7. Thereafter, the buffer memory BM reads again the electric signals of one line from the file memory FM. Thus, by controlling the picture-forming device 19, the electrostatic latent image is formed responsive to the electric signals on the surface of the photosensitive member which rotates being interlocked to the scanning operation for projection. As a matter of fact, the above operation is carried out maintaining synchronism in phase by taking into consideration the distance between the projecting position of the original projecting device on the photosensitive member 7 and the printing position of the printing head 17, as shown in FIG. 1.

After having detected the position-specifying members P1, P2 accompanying the movement of the copy board 1, the position detector PD feeds a detection signal a containing pulses $T_{P1}$, $T_{P2}$ shown in FIG. 3 to the flip-flop circuit FF1. Therefore, the flip-flop circuit FF1 is triggered by the decay of pulses $T_{P1}$, $T_{P2}$ of the detection signal a respectively, and produces a position signal b of high level between the two points of decay. As mentioned earlier, therefore, the electrostatic latent image of picture 2' of the original 2 is formed on the photosensitive member 7 by the electrophotographic copying system based upon the printing section signals c from the main control unit MC and control signal f from the control signal generator 20.

Thus, after the printing of one page, the projection of original picture, and the scanning for projection have all been completed, the recording apparatus returns to the initial state to stop the recording operation in the same manner as the conventional copying machine.

Figure 6A:
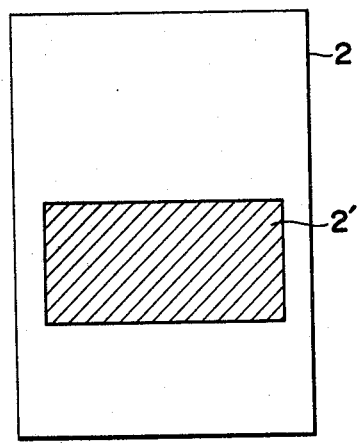
FIGS. 6-a and 6-b are plan views illustrating an original which is projected and is reproduced, and an original of characters sent from an external unit in the form of electric signals.
Figure 6B:
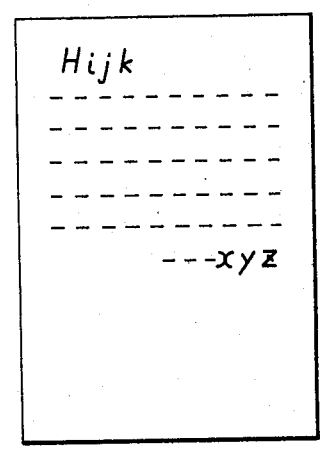

FIG. 5 depicts a flow chart which illustrates the operation for forming composite reproduction by the recording apparatus of the present invention. The description of the FIG. 5 will be omitted, since the sequence for the composite recording operation is quite obvious. Composite reproductions shown, for example, in FIGS. 7-a and 7-b can be obtained when the original to be projected and the original bearing characters that are to be transferred in the form of electric signals shown in FIGS. 6-a and 6-b, are synthesized together using the recording apparatus which operates as mentioned above. Here, the composite reproduction illustrated in FIG. 7-a is obtained by the procedure that has already been described. Namely, after space between given lines is specified, the position-specifying member P1 is set to a corresponding position on the copy board utilizing a graduation (not shown) of lines formed on the edge of the copy board, and then the position-specifying member P2 is set at a position corresponding to the size of the picture that is to be inserted. Then, the original of the picture is placed between the members P1 and P2 located at the above-mentioned positions on the copy board. Thus, by starting the copying sequence, the original of the picture can be inserted between any given lines of electric signals.

The composite reproduction shown in FIG. 7-b can be obtained as mentioned below. That is, the upper picture 2'' of the original is placed at a position from which the scanning for projection starts (by the electrophotographic copying system), and the lower picture 2''' of the original is placed on the copy board 1 on the rear side of the scanning maintaining a suitable distance from the upper picture 2''. Then, the position-specifying member P1 is set to a position at which the scanning for projection initiates and at a position which serves as the front edge of the lower picture, and the position-specifying member P2 is set at a position which serves as a rear edge of the upper picture. The copying sequence is then started. The control signal f acquires the high level just when the copying sequence is started whereby the upper picture 2'' is projected. When the projection of the upper picture is finished, the level of the control signal f is changed to the low level by the position-specifying member P2. Hence, characters are printed by the device 19 which forms pictures responsive to electric signals. Thereafter, the level of the control signal f is changed into the high level by the position-specifying member P1 such that the lower picture is projected. In this case, the upper picture 2'' and the lower picture 2''' need not be described in different originals, but may be described on the same original that is to be projected. If the flip-flop circuit FF1 of the position signal generator and the main control unit are so constructed that the state of producing signals after the completion of scanning is retained until the start of the next copying operation, the remaining characters that were not copied in the previous copying operation can be copied from the first in the next copying operation, by simply removing the original from the copy board 1 and setting the position-specifying member P2 at the position from which the scanning will start. When the position signal generator is so constructed that it newly produces signals after each copying operation, the electric signals stored in the file memory FM should be printed on a first page of the composite reproduction paper in each copying operation. Here, it should be also noted that when the characters are to be printed by the device which forms a picture responsive to signals, the characters need not necessarily be printed one line by one line.

Figure 7A:
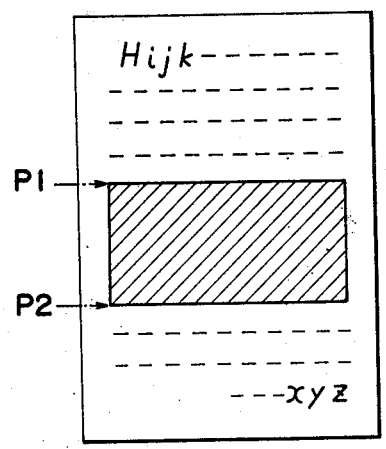
FIGS. 7-a and 7-b are plan views illustrating composite reproductions obtained from the originals of FIGS. 6-a and 6-b.
Figure 7B:
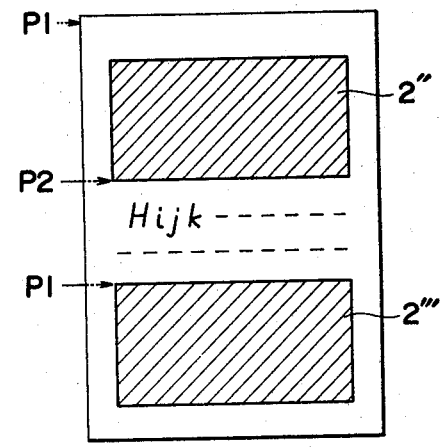

As will be appreciated from the description hereinbefore and FIG. 7-b, a pair of position-specifying members is necessary.

According to the recording apparatus of the present invention as described above, composite reproduction can be obtained by inserting the picture of an original that is to be projected between any given lines of an original bearing characters that are introduced in the form of electric signals. When the apparatus of the present invention is applied, for example, to a word processing system and the like, therefore, documents may be prepared without the need of giving attention to the positions in which originals are to be inserted. Namely, using the apparatus of the present invention, it is allowed to modify the contents at any position in the document, as well as to insert any additional description or pictures into the document. Further, as illustrated in FIG. 7-b, it is also possible to obtain a composite reproduction which looks as if data transmitted from an external source are inserted in the pictures of the original.

According to the present invention, the picture-forming device which forms electrostatic latent image of characters on the surface of the photosensitive member responsive to electric signals may be used a signal projector employing optical fibers for the printing head. Furthermore, design can be suitably modified. For example, the position signal generator and control signal generator need not be limited to those diagramatized, but may be made up, in the case of the position signal generator, for example, of a cam plate which can be arbitrarily mounted on the copy board and a switching device which produces position signals being actuated by the cam plate.

What is claimed is:

1. In an electrostatic recording apparatus which is capable of composite reproduction, having an original projecting device for forming an electrostatic latent imge of an original picture on the surface of a photosensitive member by scanning and projecting an original on a copy board, and a picture-forming device for causing a memory to read electric signals of characters fed from an external source and then forming an electrostatic latent image of characters on the surface of the photosensitive member based upon the thus read signals, the improvement characterized by comprising a position signal generator for producing position signals which give positions of the original picture on the copy board in relation to the scanning for projection, and a control signal generator for producing control signals responsive to the position signals and printing section signals which give sections in which the picture-forming device is allowed to effect the printing, wherein a main control unit of the picture-forming device feeds the printing section signals to the control signal generator and controls the input and output of the memory as well as printing of characters upon receipt of control signals from the control signal generator, such that an original picture can be inserted between lines that are specified by the position signals of pictures in the form of electric signals.

2. An electrostatic recording apparatus according to claim 1, wherein the position signal generator includes position-specifying members p1, p2 which specify the positions of the original picture on the copy board, a position detector PD which detects positions of the position-specifying members P1, P2 and produces a detection signal a, a flip-flop circuit FF1 which produces a position signal b that electrically indicates a section in which is present the picture upon receipt of detection signal a from position detector PD, and means for moving the copy board in response to the position signal from the flip-flop circuit FF1.

3. An electrostatic recording apparatus according to claim 1, wherein the control signal generator includes AND circuits $A_1$, $A_2$ for receiving the position signals, said AND circuit $A_1$ being further adapted to receive a printing section signal, said AND circuit $A_2$ being further adapted to provide a control signal, and a flip-flop circuit FF2 for producing a projection commencing signal to AND circuit $A_2$.

* * * * *